United States Patent [19]

Hatamura et al.

[11] Patent Number: 4,625,687
[45] Date of Patent: Dec. 2, 1986

[54] INTAKE ARRANGEMENT FOR INTERNAL COMBUSTION ENGINE

[75] Inventors: Koichi Hatamura; Koji Asanomi, both of Hiroshima, Japan

[73] Assignee: Mazda Motor Corporation, Hiroshima, Japan

[21] Appl. No.: 815,287

[22] Filed: Dec. 27, 1985

Related U.S. Application Data

[63] Continuation of Ser. No. 653,765, Sep. 24, 1984, abandoned.

[30] Foreign Application Priority Data

Sep. 24, 1983 [JP] Japan ................... 58-176777
Oct. 28, 1983 [JP] Japan ................... 58-202045
Oct. 28, 1983 [JP] Japan ................... 58-202046

[51] Int. Cl.[4] .......................................... F02B 31/00
[52] U.S. Cl. ................... 123/52 M; 123/308; 123/432
[58] Field of Search ........ 123/26, 302, 52 M, 52 MC, 123/306, 308, 432, 188 M

[56] References Cited

U.S. PATENT DOCUMENTS 3,408,992 11/1968 Seggern et al. ............... 123/188 M
4,300,504 11/1981 Tezuka ........................... 123/52 M
4,315,491  2/1982 Takeda ........................... 123/478
4,354,463 10/1982 Otani et al. ..................... 123/308
4,469,067  9/1984 Futakuchi ........................ 123/308

FOREIGN PATENT DOCUMENTS 2855781  6/1979 Fed. Rep. of Germany .... 123/75 B
0150516 11/1979 Japan ............................. 123/308
0070914  5/1982 Japan ............................. 123/306
57-137617  8/1982 Japan .
57-57022  4/1983 Japan .
0135319  8/1983 Japan ............................. 123/308
2087480  5/1982 United Kingdom .

OTHER PUBLICATIONS

Patents Abstracts of Japan, vol. 6, No. 240 (M-174) [1118] JP-A-57-137,617, 11/82 (Toyota Jidosha Kogyo K.K.).

Primary Examiner—Charles J. Myhre
Assistant Examiner—David A. Okonsky
Attorney, Agent, or Firm—Burns, Doane, Swecker and Mathis

[57] ABSTRACT

An intake arrangement for an internal combustion engine, including a plurality of intake ports opening into a combustion chamber, a plurality of intake valves for opening and closing the intake ports, respectively, a main intake passage having a plurality of branch intake passages connected to the intake ports, respectively, a shutter valve for opening and closing the main intake passage, and an auxiliary intake passage branched from the main intake passage and connected to one of the intake ports.

16 Claims, 6 Drawing Figures

INTAKE ARRANGEMENT FOR INTERNAL COMBUSTION ENGINE

This application is a continuation, of application Ser. No. 653,765, filed Sept. 24, 1984 and now abandoned.

BACKGROUND OF THE INVENTION

The present invention generally relates to an internal combustion engine (hereinbelow, referred to as an "engine") and more particularly, to an intake arrangement for the engine, in which a combustion chamber of each of the cylinders is provided with a plurality of, for example, two intake ports each having an intake valve for opening or closing each of the intake ports such that at least one of the intake ports is selectively used in accordance with a load applied to the engine.

Conventionally, in intake arrangements for reciprocating engines equipped with a plurality of cylinders each having a combustion chamber and a cylinder head, it is known that two intake ports having a substantially identical bore area are provided on the combustion chamber so as to secure a large intake area and an intake passage formed in the cylinder head is connected to the intake ports at a small angle with an axis of the combustion chamber so as to cause intake gases to flow into the combustion chamber substantially along the axis of the combustion chamber such that the engines can yield high outputs by maximizing charging efficiencies of the engines. The above-known two-port type intake arrangements are advantageous in that it becomes possible to obtain high outputs from the engines under high load engine operating conditions, but have such inconveniences that low flow velocity of the intake gases, inferior combustibility of an air-fuel mixture, uneconomical fuel consumption and an increase of harmful compositions in the exhaust gas are incurred under low load engine operating conditions.

In order to eliminate the above described drawbacks, Japanese Patent Laid-Open Publication No. 44419/1981 (Tokkaisho 56-44419), for example, discloses an intake arrangement for an engine, in which a first branch intake passage (for low loads) and a second branch intake passage (for high loads) provided with a shutter valve are led from a main intake passage so as to be, respectively, connected to two intake ports formed on the cylinder head and the shutter valve of the second branch intake passage is closed under the low load engine operating conditions such that intake is performed by using only the first branch intake passage. More specifically, the main intake passage is provided with a throttle valve and the throttle valve is operatively associated with the shutter valve such that the shutter valve is opened upon opening of the throttle valve beyond a predetermined opening degree. Namely, under the low load engine operating conditions, since the second branch intake passage is closed by the shutter valve, the intake gases are supplied at a relatively high flow velocity through only the first branch intake passage. Meanwhile, under the high load engine operating conditions, since the intake gases are supplied through both the first and second branch intake passages, a large charging amount of the intake gases can be secured.

However, since this prior art intake arrangement is originally designed to secure a sufficiently large amount of the intake gases under the high load engine operating conditions, each of the first and second branch intake passages has a rather large cross-sectional area. Accordingly, even if only the first branch intake passage is used under the low load engine operating conditions, it is impossible to increase a flow velocity of the intake gases sufficiently under such extremely low load engine operating conditions as idling, so that it becomes impossible to effectively produce swirling motions of an air-fuel mixture in the combustion chamber, which swirling motions are indispensable for improvement of combustibility of the air-fuel mixture. It may be imagined that such a problem can be solved by simply reducing the cross-sectional area of the first branch intake passage. However, since the first and second branch intake passages are, respectively, connected to the intake ports substantially along the axis of the combustion chamber so as to increase an output of the engine as described above, effective swirling motions of the air-fuel mixture along a circumferential direction of the combustion chamber cannot be produced even if a flow velocity of the air-fuel mixture in the combustion chamber is increased by increasing the flow velocity of the intake gases, thereby resulting in rapid reduction of the flow velocity of the air-fuel mixture in a compression stroke. Meanwhile, in the case where the cross-sectional area of the first branch intake passage is reduced extremely so as to increase the flow velocity of the intake gases as high as possible, a load range usable in the engine is restricted accordingly, so that it becomes necessary to supply the intake gases also from the second branch intake passage by opening the shutter valve even under relatively low load engine operating conditions. At this time, since the two intake ports are formed symmetrically with a horizontal center line of the combustion chamber, the intake gases drawn from the first branch intake passage are caused to collide with those drawn from the second branch intake passage, so that swirling motions of the air-fuel mixture are impaired or almost extinguished and thus, excellent combustibility of the air-fuel mixture based on its vigorous swirling motions cannot be obtained.

In order to solve the above described problem, in Japanese Patent Application No. 176776/1983 (Tokugansho 58-176776) filed simultaneously with Japanese Patent Application No. 176777/1983 (Tokugansho 58-176777) on which the present application is based for priority, the assignee assigned by the present inventors proposed an intake arrangement for an engine having a combustion chamber, a cylinder head and a cylinder block, in which a plurality of intake ports opening into the combustion chamber are opened or closed by respective intake valves and are connected to an intake passage provided with a shutter valve. It is so arranged that the shutter valve is closed under low load engine operating conditions and is opened under high load engine operating conditions such that a cross-sectional area of the intake passage is reduced or increased in accordance with engine operating conditions. Meanwhile, an auxiliary intake passage having a cross-sectional area smaller than that of the intake passage is branched from a bottom portion of the intake passage so as to be connected to one of the intake ports, with the bottom portion being disposed upstream of the shutter valve.

Namely, in the intake arrangement of the present invention as referred to above, intake gases are exclusively supplied from the auxiliary intake passage into the combustion chamber through the intake port connected to the auxiliary intake passage at a high flow velocity under the low load engine operating conditions in which the shutter valve is closed. In this case, since the auxiliary intake passage is formed on the bottom portion of the intake passage, the auxiliary intake passage extends at a small angle with a mating face between the cylinder head and the cylinder block, so that the intake gases drawn into the combustion chamber are swirled in a circumferential direction of the combustion chamber. Furthermore, under the high load engine operating conditions in which the shutter valve is opened, the intake gases are drawn from a plurality of the intake ports into the combustion chamber at a high charging efficiency, so that the engine can positively yield a high output.

Meanwhile, an intake arrangement apparently similar to that of Japanese patent application No. 176776/1983 referred to above is proposed in Japanese Patent Laid-Open Publication No. 25511/1980 (Tokkaisho 55-25511) which discloses an internal combustion engine equipped with a plurality of cylinders each having a combustion chamber formed with two intake ports such that the two intake ports are, respectively, connected to two branch intake passages of a main intake passage. In this known intake arrangement, the two branch intake passages are formed by a partition wall provided adjacent to the combustion chamber. Furthermore, two auxiliary intake passages for obliquely injecting a portion of the intake gases into the combustion chamber are, respectively, provided in the branch intake passages such that outlet ports of the auxiliary intake passages are, respectively, oriented towards opposite portions on an inner face of the cylinder, which opposite portions are substantially symmetrical with the partition wall. Each of the auxiliary intake passages has a cross-sectional area smaller than that of each of the branch intake passages so as to open into each of the intake ports such that the intake gases are drawn from the small auxiliary intake passages into the combustion chamber at a high velocity under low load engine operating conditions. In this known intake arrangement, it is so arranged that the high-speed intake gases drawn from the two outlet ports of the auxiliary intake passages under the low load engine operating conditions produces, through interference therebetween in the vicinity of a spark plug provided at a substantially central portion of the combustion chamber, intense turbulent flow of an air-fuel mixture in the vicinity of the spark plug after having collided with the inner face of the cylinder so as to effect stable combustion of the air-fuel mixture by scavenging around the spark plug effectively and increasing its flame propagation velocity. Consequently, this known intake arrangement is entirely different, in objects, from the intake arrangement of the above Japanese patent application No. 176776/1983 intended to produce vigorous swirling motions of the air-fuel mixture in the circumferential direction of the combustion chamber. Moreover, in this known intake arrangement, although the auxiliary intake passages produce the expected effects under extremely low load engine operating conditions such as idling, it becomes impossible to secure a sufficiently large amount of the intake gases only through the auxiliary intake passages even under relatively low load engine operating conditions, so that it becomes necessary to open the branch intake passages communicating with the intake ports, respectively. Thus, when the branch intake passages are opened even slightly, flow velocity of the intake gases drawn from the auxiliary intake passages drops sharply, thereby imparing the turbulent flow of the air-fuel mixture in the combustion chamber. Accordingly, in this known intake arrangement, it becomes impossible to effect stable combustion of the air-fuel mixture under engine operating conditions ranging from the relatively low load engine operating conditions slightly higher than those of idling to medium load engine operating conditions.

SUMMARY OF THE INVENTION

Accordingly, an essential object of the present invention is to provide an improved intake arrangement for an internal combustion engine having a combustion chamber formed with a plurality of intake ports, in which a main intake passage provided with a shutter valve is branched, downstream of the shutter valve, into a plurality of branch intake passages communicating with the intake ports, respectively and an auxiliary intake passage is branched, upstream of the shutter valve, from the main intake passage so as to introduce intake gases into the combustion chamber without diffusing the intake gases such that an air-fuel mixture is swirled vigorously in the combustion chamber, with substantial elimination of the disadvantages inherent in conventional intake arrangements of this kind.

In accomplishing these and other objects according to one preferred embodiment of the present invention, there is provided an improved intake arrangement for an internal combustion engine having a combustion chamber, comprising a plurality of intake ports for supplying intake gases into said combustion chamber, which open into said combustion chamber; a plurality of intake valves for opening and closing said intake ports, respectively; a main intake passage; a shutter valve for opening and closing said main intake passage, which is provided in said main intake passage; said shutter valve being adapted to be held in a closed state when the amount of the intake gases is small and to be opened when the amount of the intake gases is increased; said main intake passage being branched, at a branch point disposed downstream of said shutter valve, into a plurality of branch intake passages such that said branch intake passages are, respectively, connected to said intake ports; and an auxiliary intake passage having an inlet port and an outlet port, which is branched, at said inlet port, from said main intake passage so as to be connected, at said outlet port, to one of said intake ports.

In accordance with the present invention, since the air-fuel mixture can be vigorously swirled in the combustion chamber under the low load engine operating conditions, combustibility of the air-fuel mixture can be improved under the low load engine operating conditions, thereby resulting in improvement of the fuel consumption performance and reduction of the exhaust emission.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
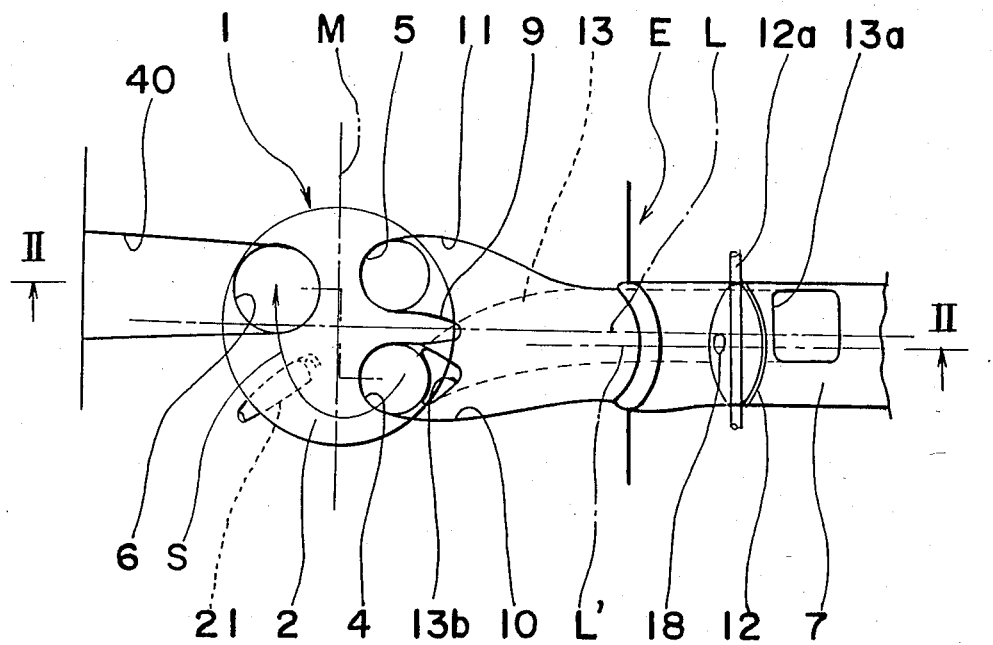
FIG. 1 is a schematic fragmentary top plan view of an intake arrangement for an engine, according to the present invention.

Before the description of the present invention proceeds, it is to be noted that like parts are designated by like reference numerals throughout the accompanying drawings.

Figure 2:
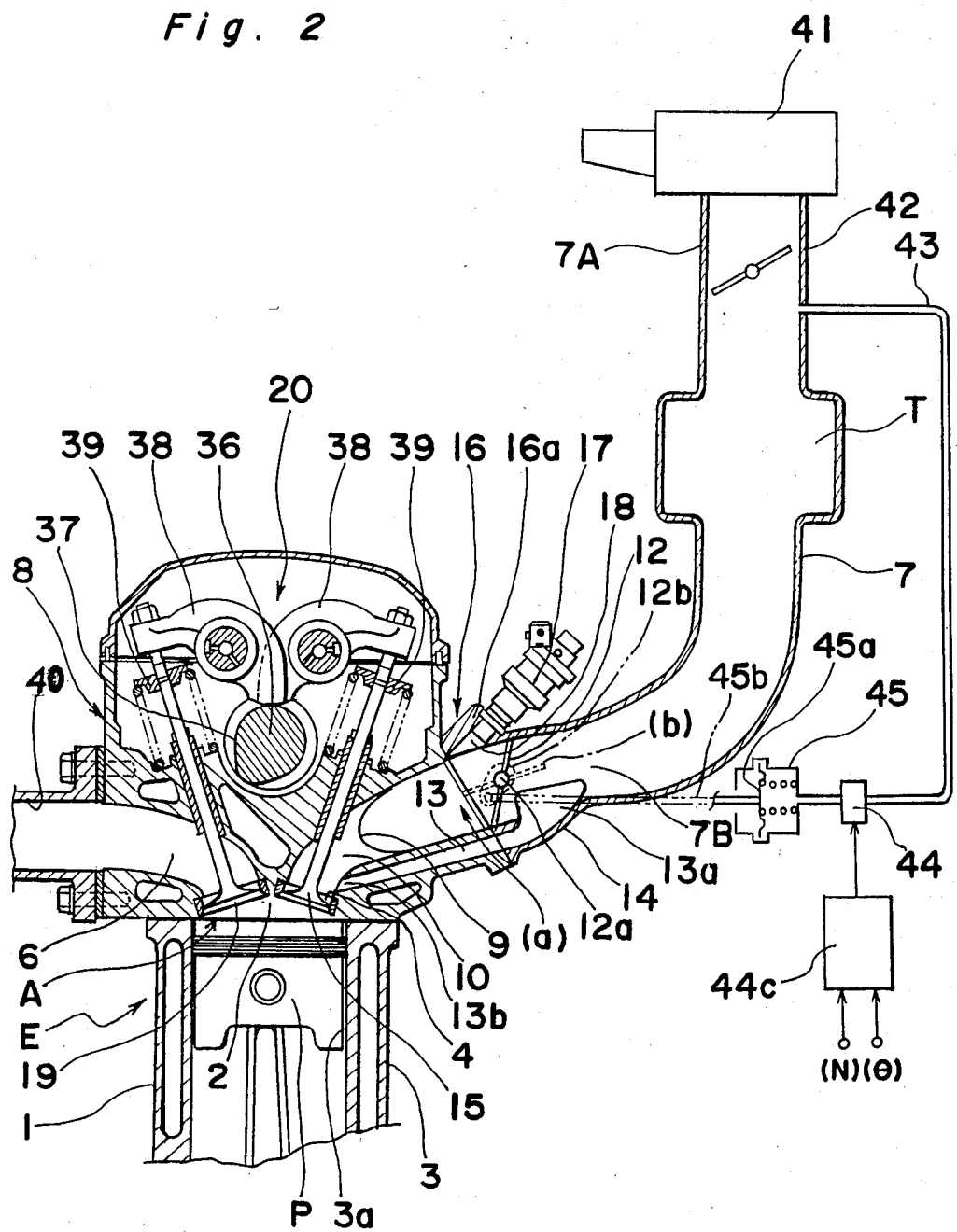
FIG. 2 is a cross-sectional view taken along the line II—II in FIG. 1.

Referring now to the drawings, there is shown in FIGS. 1 and 2, an intake arrangement for an internal combustion engine according to one preferred embodiment of the present invention, which includes a plurality of intake ports 4 and 5 for supplying intake gases, respectively open into each combustion chamber of the internal combustion engine, and intake valves 15 disposed in the respective intake ports 4 and 5, and is characterized in that there are further provided a shutter valve 12 disposed in a main intake passage 7 connected to the plurality of the intake ports 4 and 5 with the shutter valve 12 being adapted to be held in a closed state when intake air amount is small and to be opened when the intake air amount is increased for control to increase or decrease passage area of the main intake passage 7 according to the engine operating conditions, and an auxiliary intake passage 13 branching out from a bottom portion of the main intake passage 7 at an upstream side of the shutter valve 12 so as to be connected to either one of said intake ports 4 and 5 and having passage area smaller than that of the main intake passage 7.

It should be noted here that in the embodiments according to the present invention to be described hereinbelow, although the intake arrangement of the present invention is described with reference to only one cylinder of the internal combustion engine for clarity, it is to be understood that such internal combustion engine includes a plurality of cylinders, to each of which the arrangement of the present invention is applied.

More specifically, as shown in FIGS. 1 and 2, the internal combustion engine E includes a cylinder block 3 (FIG. 2) having cylinder bores 3a formed therein, and a cylinder head 8 (FIG. 2) mounted on the upper portion of the cylinder block 3 to constitute cylinders 1 therebetween, with a piston P being movably accommodated in each of the cylinders bores 3a for reciprocating movements in the axial direction to define the combustion chamber 2 in said cylinder bore 3a.

In the cylinder head 8 for the combustion chamber 2 of each of cylinder bores 3a of the engine E, the first and second intake ports 4 and 5 of approximately the same diameter respectively provided with intake valves 15 are opened in a generally symmetrical relation with respect to a center line L in a widthwise direction of a cylinder block 3 (FIG. 2) of the engine E, while in a position confronting a second intake port 5, with a longitudinal center line M held therebetween, an exhaust port 6 provided with an exhaust valve 19 is opened for communication with an exhaust passage 40 to constitute an exhaust system.

The intake system includes the main intake passage 7 which extends from an air cleaner 41, and includes an upper passage portion 7A provided with a throttle valve 42 between the air cleaner 41 and a surge tank T, and lower passages 7B separated from the surge tank T so as to be led into the respective cylinders 1.

Figure 3:
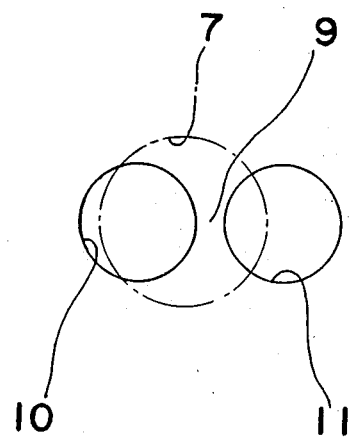
FIG. 3 is a schematic view explanatory of overlap between a main intake passage and two branch intake passages employed in the intake arrangement of FIG. 1.

The main intake passage 7 for supplying intake gases into the first and second intake ports 4 and 5 for each cylinder 1 is gradually divided within a cylinder head 8 (FIG. 2), and at a position immediately before the first and second intake ports 4 and 5, is bifurcated by a partition wall 9 formed to project or extend generally along the widthwise direction center line L, with branched intake passages 10 and 11 thus formed being respectively connected to the first and second intake ports 4 and 5. As illustrated in FIG. 1, a center line L' of the intake passage 7 is slightly deviated towards the side of the first intake port 4 with respect to the widthwise direction center line L for a straight connection with the first intake port 4 as compared with the connection with respect to the second intake port 5, with the shutter valve 12 being provided at an upstream side thereof. Namely, as shown in FIG. 3, an overlap portion between the main intake passage 7 and the branched intake passage 10 is larger, in area, than that between the main intake passage 7 and the branched intake passage 11.

The shutter valve 12 is arranged, for example, to be associated with the throttle valve 42 so that it is closed during low load operation where the opening degree of the throttle valve 42 is comparatively small, and opened when the throttle valve 42 is opened beyond a predetermined opening degree.

For controlling the shutter valve 12 for opening and closing, there can be provided a known open/close control mechanism, for example, a link mechanism which is associated with the throttle valve 42 such that the shutter valve 12 is opened when the opening degree of the throttle valve 42 becomes large. In this embodiment, there are provided a negative pressure actuator 45, a three-way magnet valve 44, and a control unit 44c, etc. More specifically, the negative pressure actuator 45 has a diaphragm 45a connected to an arm 12b fixed to a shaft 12a of the shutter valve 12 through a connecting rod 45b, and is communicated with the intake passage 7 at the downstream side of the throttle valve 42 through a pipe line 43 via the three-way magnet valve 44 to which data for the number N of revolutions of the engine (or engine speed) and throttle valve opening degree $\theta$, are applied through the control unit 44c so as to be introduced into the actuator 45, a negative pressure in the close zone, and atmospheric air in the open zone. Thus, the shutter valve 12 is held in a closed state when intake air amount is small and is opened when the intake air amount is increased.

It should be noted here that, although the shutter valve 12 is intended to form a swirl S, such swirl may be produced even if the shutter valve 12 is not completely closed, and therefore, said shutter valve 12 is not necessarily fully closed even in the closed state, but it is possible that said valve 12 is slightly open even at the minimum degree of opening so as to allow air to flow towards the downstream side thereof. The above arrangement is preferable, since the fuel may be rapidly introduced into the cylinder in the case where a fuel injection port 18 to be described later is provided at the downstream side of the shutter valve 12. Namely, since opening and closing of the shutter valve 12 are controlled by signals of not only the engine load (e.g. the opening degree $\theta$ of the throttle valve 42) but also the number N of revolutions of the engine E, it can be said that the shutter valve 12 is set in the closed state when the amount of the intake air is small and is opened when the amount of the intake air is increased.

Moreover, at the upstream side from the shutter valve 12 of the intake passage 7, an upstream side opening 13a of the auxiliary intake passage 13 is opened in a bottom wall of the intake passage 7 so as to be deviated in position towards the side of the second intake port 5 with respect to the center line L' of the intake passage 7. The auxiliary intake passage 13 referred to above has a downstream side opening 13b open in a position adjacent to the first intake port 4, and is gently curved so as to cross the center line L' of the intake passage 7 for communication of the upstream side opening 13a with the downstream side opening 13b. As specifically shown in FIG. 2, the above auxiliary intake passage 13 is formed in a bottom wall 14 constituting a bottom portion of the intake passage 7, and the downstream side opening 13b thereof is set in a position at a downstream side of the branching point for the bifurcated intake passages 10 and 11 and as close to the first intake port 4 to be opened or closed by the intake valve 15 as possible.

Therefore, the total amount of intake gases flowing down the auxiliary intake passage 13 is to flow into the combustion chamber 2 through the first intake port 4. The auxiliary intake passage 13 intersects with the bifurcated intake passage 10 which is curved at a large radius of curvature in an axial direction of the cylinder 1 at an immediately upstream side of the first intake port 4 in such a manner that said passage 13 forms a small angle of inclination with respect to a mating surface A between the cylinder block 3 and the cylinder head 8, thus being provided with a directivity in a circumferential direction of the combustion chamber 2. Accordingly, the intake gases drawn from the auxiliary intake passage 13 into the combustion chamber 2 produce vigorous swirling motions of the air-fuel mixture in the combustion chamber 2.

In order to facilitate generation of the vigorous swirling motions of the air-fuel mixture in the combustion chamber 2, it is desirable that the auxiliary intake passage 13 be oriented, in the vicinity of the downstream side opening 13b, substantially in a direction approximately tangential with respect to the inner face of the cylinder bore 3a. Thus, it becomes necessary to curve the auxiliary intake passage 13. However, since the upstream side opening 13a is disposed at the side of the second intake port 5 while the downstream side opening 13b is disposed at the side of the first intake port 4 as described above, the auxiliary intake passage 13 is of a relatively small curve without being bent sharply as shown in FIG. 1, so that the auxiliary intake passage 13 is subjected to a small flow resistance.

Under the low load engine operating conditions in which the shutter valve 12 is closed, a substantially total amount of the intake gases flowing through the main intake passage 7 are drawn from the upstream side opening 13a into the auxiliary intake passage 13 so as to be introduced into the combustion chamber 2 through the downstream side opening 13b. Since the auxiliary intake passage 13 has a cross-sectional area smaller than that of each of the branched intake passages 10 and 11, the intake gases flow through the auxiliary intake passage 13 at a relatively high velocity even under the low load engine operating conditions in which the intake gases are small in amount. Furthermore, since the auxiliary intake passage 13 forms a small angle with the mating surface A between the cylinder block 3 and the cylinder head 8 and is oriented in the circumferential direction of the cylinder bore 3a as described above, the intake gases drawn from the auxiliary intake passage 13 into the combustion chamber 2 produce the vigorous swirling motions of the air-fuel mixture in the combustion chamber 2.

In an engine load range where the shutter valve 12 is caused to start opening, the intake gases flowing through the main intake passage 7 substantially start flowing into the branched intake passages 10 and 11 such that the intake gases flowing through the auxiliary intake passage 13 are decreased in amount. Since the center line L' of the main intake passage 7 is deviated towards the first intake port 4 such that the overlap portion between the main intake passage 7 and the branched intake passage 10 is larger, in area, than that between the main intake passage 7 and the branched intake passage 11 as described above, the intake gases flowing from the main passage 7 through the branched intake passage 10 to the first intake port 4 are larger, in amount, than those flowing from the main intake passage 7 through the branched intake passage 11 to the second intake port 5. The intake gases proceeding from the branched intake passage 10 to the first intake port 4 flow together with the intake gases proceeding to the first intake port 4 through the auxiliary intake passage 10 so as to produce the swirling motions of the air-fuel mixture in the combustion chamber 2.

At a slightly downstream side from the upstream side opening 13a of the auxiliary intake passage 13, the shutter valve 12 for selective opening or closing of the intake passage 7 is disposed so as to be inclined slantwise downwardly towards the downstream side, while at a fixing portion 16a provided on an upper wall 16 of the intake passage 7 slightly at a downstream side from the shutter valve 12, there is mounted a fuel injector 17. In the above case, the fuel injection port 18 thereof is set in such a position at a slightly downstream side from the rotary shaft 12a of the shutter valve 12 and on the center line L' of the intake passage 7 (FIG. 1). As is well known to those skilled in the art, the fuel jetted by the fuel injector 17 advances straight without spreading up to a certain distance, with a subsequent diffusion in a conical shape. Accordingly, when the fuel injection port 18 is set on the center line L' of the intake passage 7, owing to the fact that the center line L' is preliminarily deviated towards the side of the first intake port 4, a distribution ratio of the fuel diffused in the conical shape with respect to the first and second intake ports tends to be increased at the side of the first intake port 4.

Accordingly, during the low load operation of the engine E in which the intake is exclusively effected through the first intake port 4, a still more amount of fuel is to be mixed with the intake gases for improvement of combustibility of the air-fuel mixture.

Moreover, in the case where the shutter valve 12 is disposed between the upstream side opening 13a of the auxiliary intake passage 13 and the fuel injection port 18 in a posture inclined slantwise downwardly so as to be turned clockwise for opening from a fully closed position (a) shown by a solid line to a fully opened position (b) indicated by a dotted line in FIG. 2, it is possible to reduce a volume of the intake passage at the downstream side of the shutter valve 12 to the minimum during closing of the shutter valve 12. The fuel injector 17 is provided at the upstream side of the partition wall 9 for the first and second intake ports 4 and 5, and can not be disposed at an excessively downstream side, but if the shutter valve 12 required to be installed at the upstream side thereof is provided as described above, said valve 12 can be installed most close to the fuel injector 17, with a minimum space occupied thereby and therefore, the intake passage volume at the downstream side of the shutter valve 12 which becomes a dead volume or wasteful volume during closing of the shutter valve 12 may be reduced to the minimum.

In the above arrangement, since the shutter valve 12 is not necessarily fully closed even in the closed state thereof, with a possibility of opening to a certain extent even at the minimum opening degree for permitting air to flow towards the downstream side thereof as described earlier, the fuel may be rapidly introduced into the cylinder in the case where the fuel injection port 18 is provided at the downstream side of the shutter valve 12. More specifically, in the closed state (closed position) of the shutter valve 12, most of the intake air is led into the cylinder 1 via the auxiliary intake passage 13 through the first intake port 4 so as to form a swirl perpendicular to the axial direction of the cylinder 1 and along the circumferential direction thereof. Meanwhile, a small amount of air flows through a gap between the shutter valve 12 and the wall of the main intake passage 7, and is introduced into the cylinder 1 through both of the first and second intake ports 4 and 5. However, since such air is small in amount, the swirl formed by the auxiliary intake passage 13 may be maintained to be properly strong.

It is to be noted here that the intake valve 15 for opening or closing the first intake port 4, another intake valve 15 (not particularly shown) for opening or closing the second intake port 5 and an exhaust valve 19 for opening or closing an exhaust port 6, are respectively driven for opening and closing at predetermined timings synchronized with rotation of the engine E by a conventional overhead cam driving mechanism 20 provided on the upper portion of the cylinder head 8.

The cam driving mechanism 20 includes a cam shaft 36 driven by a crank shaft (not shown) of the engine E, and a cam 37 formed on said cam shaft 36 and corresponding to the respective intake valves 15 and exhaust valve 19. The cam 37 engages one end of each rocking arm 38 provided to correspond to each of the intake valves 15 and exhaust valve 19, while the other end of the rocking arm 38 contacts each tappet 39 provided on a valve shaft of each of the valves 15 and 19 in a known manner.

Meanwhile, as shown in FIG. 1, a spark plug disposed at a position where the first and second intake ports 4 and 5 and the exhaust port 6 are not provided, and more specifically, at a position where it confronts the first intake port 4 in which the auxiliary intake passage 13 is opened, with the longitudinal center line M of the combustion chamber 2 held therebetween.

In the disposition of the spark plug 21 as described above, since said spark plug 21 is to be located on a turning locus of the swirl formed by the auxiliary intake passage 13, it is possible to ignite the air-fuel mixture with a favorable ignitability.

When the throttle valve 42 is opened beyond a predetermined opening degree upon increase of the engine load, the shutter valve 12 is also caused to start opening. In an engine load range where the shutter valve 12 is opened slightly, a portion of the intake gases is still supplied into the combustion chamber 2 through the auxiliary intake passage 13. In this state, since the auxiliary intake passage 13 opens into only the intake port 4 and the upstream side opening 13a of the auxiliary intake passage 13 is disposed at the side of the second intake port 5, the intake gases supplied from the first intake port 4 into the combustion chamber 2 is larger, in amount, than those supplied from the second intake port 5 into the combustion chamber 2, whereby the air-fuel mixture can be swirled to some extent even under relatively increased load engine operating conditions.

Figure 4:
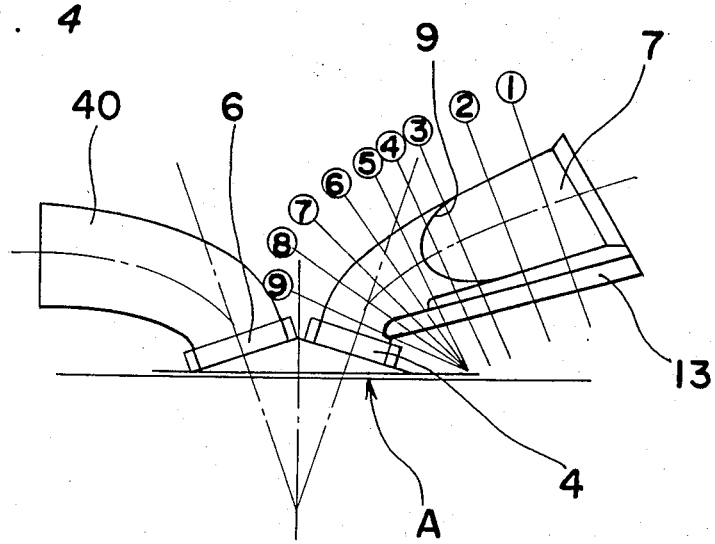
FIG. 4 is a schematic fragmentary view of FIG. 2, particularly showing the main intake passage and the branch intake passages of FIG. 3.
Figure 5:
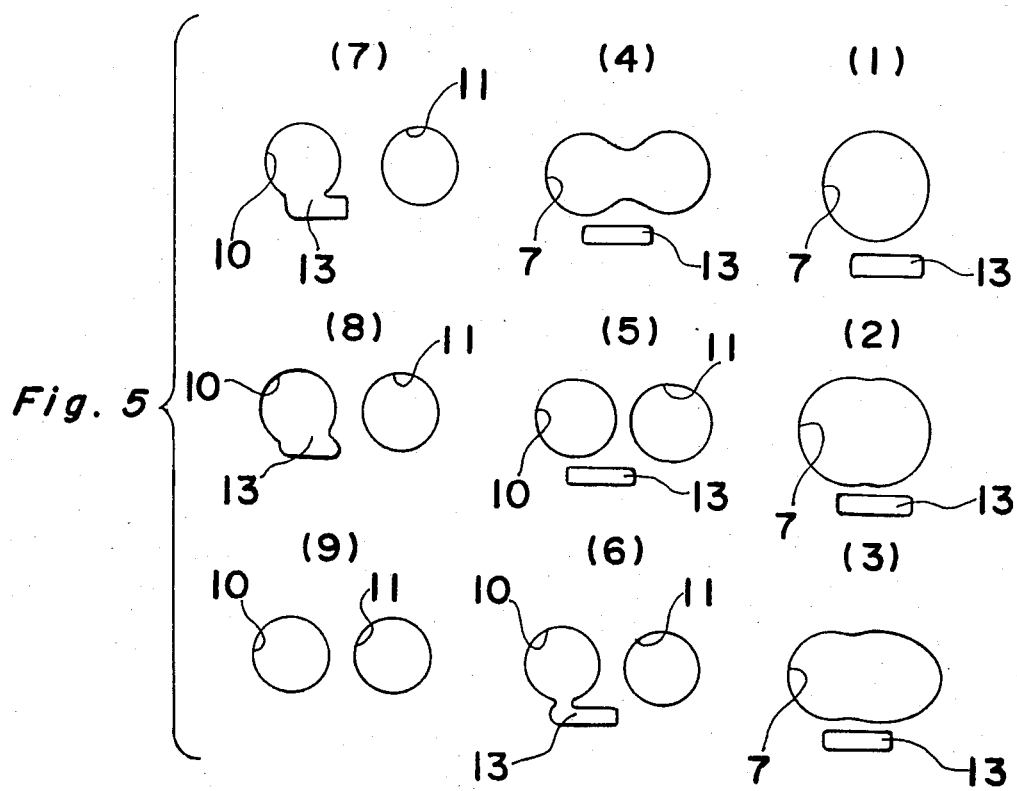
FIGS. 5(1) to 5(9) are cross-sectional views taken along the lines 1 to 9 in FIG. 4, respectively.

Referring to FIGS. 4 and 5, there are shown in FIG. 5 variations of cross sectional shapes of the intake passage 7 with the cylinder head 8 taken along the lines (1) to (9) in FIG. 4 as indicated by the corresponding numbers in FIG. 5.

As shown in FIG. 5, the cross sectional shape of the intake passage 7 which is circular at first varies from an elliptic shape to a shape as in a figure eight towards the downstream side, and is then divided into the bifurcated intake passages 10 and 11 having two circular cross sections. The auxiliary intake passage 13 located below the main intake passage 7 and having a flat rectangular cross section, with a sufficiently small passage cross sectional area as compared with the passage cross section area of the intake passage 7, is gradually displaced from an initial position deviated towards the second intake port 5 in the main intake passage 7 (i.e., towards the right in FIG. 5) to a position at the side of the first intake port 4 (at the left side in FIG. 5) so as to cross the bottom wall of the bifurcated intake passage 10 connected to the first intake port 4 to finally open at the immediate upstream side of the first intake port 4.

As shown in FIGS. 1 and 2, the auxiliary intake passage 13 formed in the bottom wall 14 constituting the bottom face of the main intake passage 7, is provided to make a comparatively small angle of inclination with respect to the mating surfaces A between the cylinder block 3 and the cylinder head 8, and as viewed from the top, is smoothly curved to cross the first intake port 4 from the side of the second intake port 5. Accordingly, particularly during the low load operation of the engine E in which the shutter valve 12 is totally closed, the intake gases flowing down exclusively through the auxiliary intake passage 13 increase its velocity by being passed through the narrow passage and flows into the combustion chamber 2 through the first intake port 4 while being directed towards the circumferential direction of the combustion chamber 2 thus generating a swirl in the circumferential direction within the combustion chamber 2.

Since the swirl referred to above is formed in the circumferential direction of the combustion chamber 2, it is not readily attenuated or dampened, and is favorably ignited for combustion by the ignition of the spark plug 21 at the last stage of a compression stroke.

It should be noted here that in the foregoing embodiment, although it is so arranged that the main intake passage 7 is branched at the downstream side of the shutter valve 12, with the auxiliary intake passage 13 adapted to cross the first intake port side from the second intake port side, the present invention is not limited, in its application, to such arrangement, but may be further modified in various ways within the scope.

Figure 6:
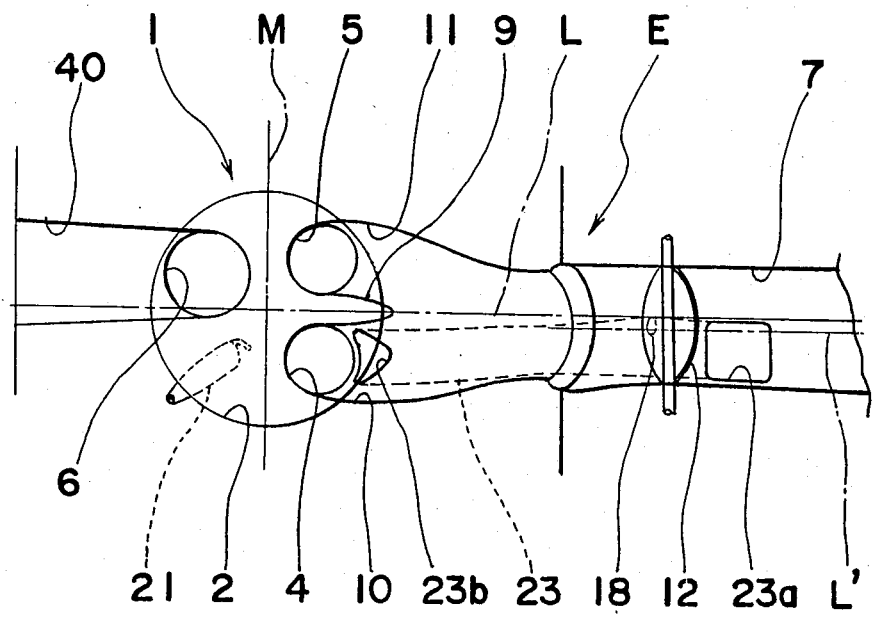
FIG. 6 is a view similar to FIG. 1, particularly showing a modification thereof.

For example, as shown in FIG. 6, it may be so modified that the auxiliary intake passage 23 is formed straight along an extension line of the bifurcated intake passage 10 connected to the first intake port 4, with an upstream side opening 23a thereof being opened in the bottom wall of the intake passage 7 at the upstream side of the shutter valve 12, and a downstream side opening 23b thereof opened in the position adjacent to the first intake port 4.

It is to be noted that the intake arrangement of the present invention is applied to the engine provided with the fuel injector in the above embodiment but can be also applied to an engine provided with a carburettor.

In accordance with the present invention, since the air-fuel mixture can be vigorously swirled in the combustion chamber under the low load engine operating conditions, combustibility of the air-fuel mixture can be improved under the low load operating conditions, whereby the fuel consumption performance is improved and the exhaust emission is reduced.

Furthermore, in accordance with the present invention, since the auxiliary intake passage for feeding the intake gases into the combustion chamber under the low load engine operating conditions is connected to one of the intake ports, it becomes possible to supply the intake gases into the combustion chamber at a relatively high velocity in a direction deviated away from the center of the combustion chamber under the low load engine operating conditions where the intake gases are small in amount, so that the air-fuel mixture can be vigorously swirled in the combustion chamber. In addition, since the center line of the main intake passage is deviated towards said one of the intake ports, to which the auxiliary intake passage is connected, the air-fuel mixture can be swirled to some extent even in the engine load range where the shutter valve is caused to start opening, whereby it becomes possible to effect stable combustion of the air-fuel mixture in a relatively wide range of the low load engine operating conditions.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An intake arrangement for an internal combustion engine having a combustion chamber including a cylinder having an axial and a lateral direction and a cylinder head, comprising:
    first and second intake ports for supplying intake gases into said combustion chamber, which open into said combustion chamber;
    a plurality of intake valves for opening and closing said intake ports, respectively;
    a main intake passage having a centerline constituting a main-axis;
    a shutter valve for opening and closing said main intake passage, which is provided in said main intake passage; said shutter valve being adapted to be held in a closed state when the amount of intake gases is small and to be opened when the amount of intake gases is increased;
    a throttle valve in said main intake passage upstream of said shutter valve with respect to a direction of flow of gases towards the combustion chamber;
    said main intake passage being branched, at a branch point disposed downstream of said shutter valve, into first and second branch intake passages such that said first and second branch intake passages are, respectively, connected to said first and second intake ports;
    said first and second branch intake passages being on opposite sides of said center line; and
    means for causing a swirling flow of the gases in a circumferential direction of the combustion chamber comprising an auxiliary intake passage having an upstream end opening into the main intake passage at a location upstream of the shutter valve, and also having a downstream end opening immediately adjacent said first intake port only into said first branch intake passage, the cross-section of said downstream end of said auxiliary intake passage being short in the axial direction of said cylinder and long in the lateral direction, said auxiliary intake passage having a portion which extends from a side of said center line on which said second intake port is located and crosses said center line to end at the downstream end of said auxiliary intake passage, said upstream end of said auxiliary intake passage located downstream of said throttle valve in a lower wall of said main passage.

2. An intake arrangement as claimed in claim 1, further including a fuel injector for injecting fuel into said main intake passage,
    said fuel injector being provided with a fuel injection port such that said fuel injection port is disposed, downstream of said shutter valve, in said main intake passage, thereby to supply the fuel into said main intake passage at the downstream side of said shutter valve from said fuel injector through said fuel injection port.

3. An intake arrangement as claimed in claim 1, and further including a fuel injector located downstream of said shutter valve and upstream of said branch port said fuel injector being provided with a fuel injection port disposed at a position deviated from said centerline of said intake ports towards said one of said intake ports.

4. An intake arrangement as claimed in claim 1, further including a carburettor.

5. An intake arrangement as claimed in claim 1, wherein said downstream end opening is wholly disposed downstream of said branch point.

6. An intake arrangement as claimed in claim 1, wherein a centerline of said intake ports extends in parallel with an axis of said main intake passage such that said axis of said main intake passage is deviated from said centerline of said intake ports towards said first intake port.

7. An intake fuel arrangement as claimed in claim 1, further including a fuel injector for injecting into said main intake passage,
    said injector being provided with a fuel injection port such that said fuel injection port is disposed, downstream of said shutter valve, in said main intake passage, thereby to supply the fuel into said main intake passage at the downstream side of said shutter valve from said fuel injector through said fuel injection port, and wherein the branch point of the main intake passage is disposed inside said cylinder head and the shutter valve is disposed adjacent said cylinder head.

8. An intake arrangement as claimed in claim 1, wherein said portion of said auxiliary intake passage is gently curved so as to be spaced further away from a center of said cylinder with respect to the axial direction of said cylinder when said auxiliary intake passage comes close to the downstream end of said auxiliary intake passage.

9. An intake arrangement as claimed in claim 1, wherein said upstream end opening has a portion of greater area disposed on an opposite side of said center line with respect to said first intake port of said main intake passage as observed from an axial direction of a cylinder defining said combustion chamber.

10. An intake arrangement as claimed in claim 1, wherein said upstream end opening has a portion of lesser area disposed on an opposite side of said center line with respect to said first intake port of said main intake passage as observed from an axial direction of a cylinder defining said combustion chamber.

11. An intake arrangement as claimed in claim 10, wherein said downstream end opening is wholly disposed downstream of said branch point.

12. An intake arrangement as claimed in claim 11, wherein a centerline of said intake ports extends in parallel with said axis of said main intake passage such that said axis of said main intake passage is deviated from said centerline of said intake ports towards said first intake port.

13. An intake arrangement for an internal combustion engine having a combustion chamber including a cylinder having an axial and a lateral direction and a cylinder head, comprising:
   first and second intake ports for supplying intake gases into said combustion chamber, which open into said combustion chamber;
   a plurality of intake valves for opening and closing said intake ports, respectively;
   a main intake passage having a centerline constituting a main axis;
   a shutter valve for opening and closing said main intake passage, which is provided in said main intake passage;
   a throttle valve in said main intake passage upstream of said shutter valve with respect to a direction of flow of gases towards the combustion chamber;
   said main intake passage being branches, at a branch point disposed downstream of said shutter valve, into first and second branch intake passages such that said branch intake passages are, respectively, connected to said first and second intake ports, said first and second branch intake passages being on opposite sides of said center line; and
   means for causing a swirling flow of the gases in a circumferential direction of the combustion chamber, comprising an auxiliary intake passage having an upstream end opening into the main intake passage in a lower wall thereof at a location upstream of the shutter valve, and also having a downstream end opening immediately adjacent said first intake port only into said first branch intake passage, wherein the auxiliary intake passage has a flat rectangular cross-section that is short in the axial direction of said cylinder and long in the lateral direction, said auxiliary passage having portion which extends from a side of said center line on which said second intake port is located and crosses said center line to end at the downstream end of said auxiliary intake passage, the lateral width of said downstream end of said auxiliary intake passage being substantially equal to the diameter of said first intake port.

14. An intake arrangement as claimed in claim 13, wherein the downstream end opening is wholly disposed downstream of said branch point.

15. An intake arrangement as claimed in claim 13, wherein the auxiliary intake passage is gently curved with the downstream end thereof opening into the first intake port.

16. An intake arrangement as claimed in claim 13, wherein the engine is a multicylinder engine and the auxiliary intake port and the shutter valve are employed for each of the combustion chambers of engine.

* * * * *